(No Model.)
O. HARRIMAN.
VENTILATOR FOR RAILWAY CARS.
No. 424,476. Patented Apr. 1, 1890.
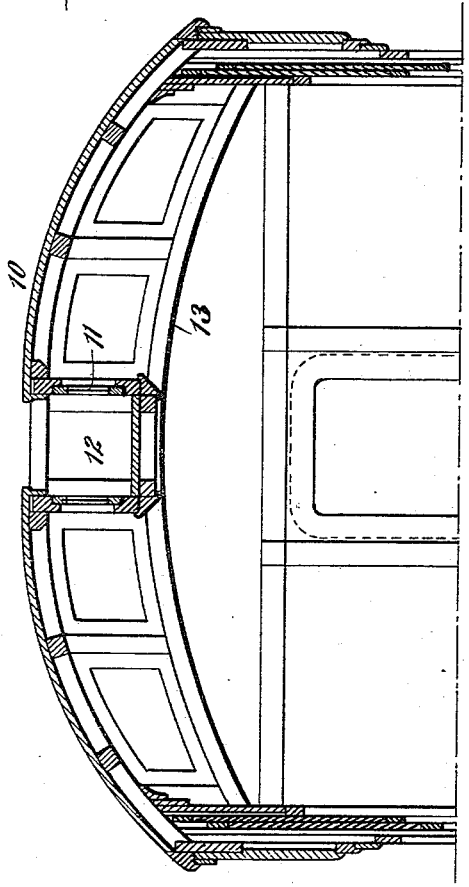
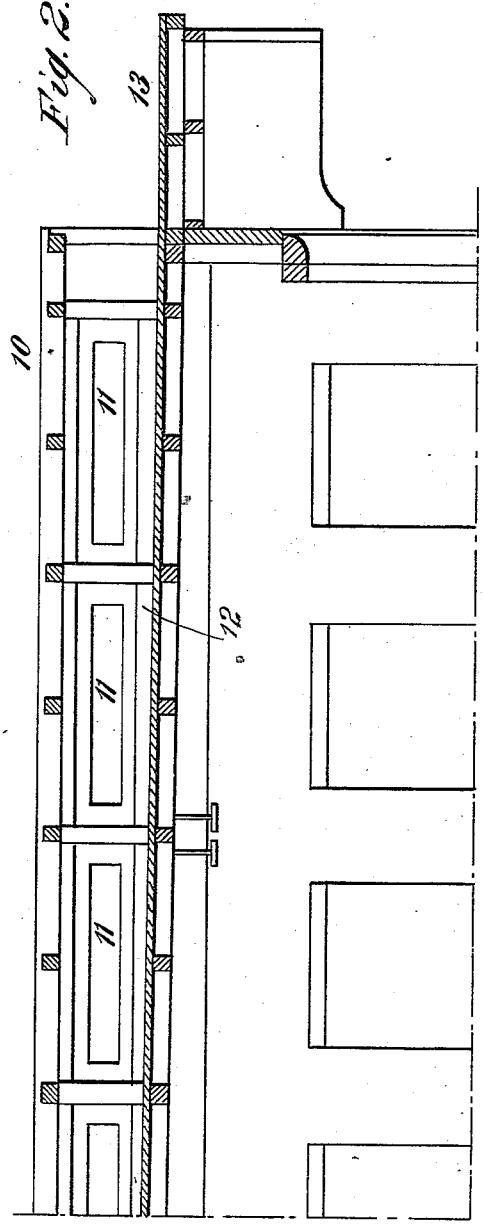
WITNESSES:
INVENTOR:
O. Harriman
BY
Munn & Co.
ATTORNEYS.

UNITED STATES PATENT OFFICE.

ORLANDO HARRIMAN, OF NEW YORK, N. Y.

VENTILATOR FOR RAILWAY-CARS.

SPECIFICATION forming part of Letters Patent No. 424,476, dated April 1, 1890.

Application filed August 1, 1889. Serial No. 319,380. (No model.)

*To all whom it may concern:*

Be it known that I, ORLANDO HARRIMAN, of New York city, in the county and State of New York, have invented a new and Improved Ventilator for Railway-Cars, of which the following is a full, clear, and exact description.

This invention relates to the construction of railway-cars, the object of the invention being to provide for increased head-room in said cars, the invention being especially applicable for use in connection with cars of the class illustrated, described, and claimed in my prior application, Serial No. 314,086, filed on the 13th day of June, 1889; and to the ends named the invention consists of a car having a longitudinal opening in its roof and provided with a trough-like structure having ventilators in its sides depending from the roof below said opening, as hereinafter fully described.

Reference is to be had to the accompanying drawings, forming a part of this specification, in which similar figures of reference indicate corresponding parts in both views.

Figure 1 is a cross-sectional view of a portion of a car representing the same as it appears when embodying my invention; and Fig. 2 is a central longitudinal sectional view of a portion of the car.

In constructing a car such as the one forming the subject-matter of this application, I carry the car-roof 10 upward to the height of the ordinary ventilating-dome, and provide ventilating-windows 11 below the car-roof, said ventilating-windows being arranged to open into a trough-like structure or open-topped channel 12, which said channel is open to the surrounding atmosphere, the bottom of the channel 12 being inclined from the center of the car downward toward either end of the car, so that all gathered water will be discharged onto the end roof-sections 13.

By means of the construction above described I secure a material increase of head-room within the car and at the same time as perfect a ventilation of the car as was obtained by the old form of ventilating-dome.

Having thus described my invention, I claim as new and desire to secure by Letters Patent—

1. A car having a longitudinal opening in its roof and provided with a trough-like structure depending from the roof below said opening, the sides of the trough-like structure being provided with ventilators, substantially as described.

2. A car provided with an open-top channel beneath the level of the roof and having an inclined bottom, and the car-ventilators opening into said channel, substantially as described.

3. A car having a longitudinal opening in its roof and provided with a trough-like structure depending from the roof below said opening, having its bottom inclined from the center toward each end, and provided with a series of ventilators in its sides, substantially as herein shown and described.

ORLANDO HARRIMAN.

Witnesses:
EDWARD KENT, Jr.,
C. SEDGWICK.